United States Patent
Morishima et al.

(12)

(10) Patent No.: US 7,622,823 B2
(45) Date of Patent: Nov. 24, 2009

(54) UNINTERRUPTIBLE POWER SUPPLY WITH LOW LEAKAGE CURRENT

(75) Inventors: Yoichi Morishima, Houston, TX (US); Takashi Morishita, Houston, TX (US)

(73) Assignee: Toshiba International Corporation, Houston, TX (US)

( * ) Notice: Subject to any disclaimer, the term of this patent is extended or adjusted under 35 U.S.C. 154(b) by 279 days.

(21) Appl. No.: 11/737,427

(22) Filed: Apr. 19, 2007

(65) Prior Publication Data

US 2008/0019155 A1   Jan. 24, 2008

Related U.S. Application Data

(60) Provisional application No. 60/807,689, filed on Jul. 18, 2006.

(51) Int. Cl.
*H02J 7/00* (2006.01)
(52) U.S. Cl. ............................ 307/66; 307/87; 363/37
(58) Field of Classification Search .................. 307/11, 307/40, 66, 115, 125, 134, 135; 363/16, 363/17, 34, 35, 87, 98, 127, 132; 327/112, 327/381, 458, 469, 544, 546
See application file for complete search history.

(56) References Cited

U.S. PATENT DOCUMENTS

| | | | | |
|---|---|---|---|---|
| 5,977,814 A | * | 11/1999 | Ishii | ............................ 327/434 |
| 6,266,260 B1 | * | 7/2001 | Zahrte et al. | ................. 363/132 |
| 6,879,500 B2 | | 4/2005 | Liu et al. | |

* cited by examiner

*Primary Examiner*—Rajnikant B Patel
(74) *Attorney, Agent, or Firm*—Watchstone P+D, pllc; Stephen B. Parker

(57) ABSTRACT

An uninterruptible power supply having a controllable leakage current is disclosed. The leakage current is controlled by adjusting a switching speed (i.e., dV/dt rate) of switches in the output inverter (i.e. DC-AC converter stage). Leakage current can be reduced by reducing the switching speed (dV/dt rate) of the output inverter switches. In one embodiment, leakage current is held constant or moderated as output power decreases by reducing the switching speed (responsive to leakage current) as output power decreases. The switching speed can be adjusted by adjusting the gate resistance or gate voltage. Increasing the gate resistance or decreasing the gate voltage will cause a reduction in the switching speed, and increase in leakage current. Conversely, reducing the gate resistance, or decreasing the gate voltage will cause an increase in switching speed, and increase in leakage current. The present invention is applicable to any uninterruptible power supply having output inverter switches.

11 Claims, 7 Drawing Sheets

UNINTERRUPTIBLE POWER SUPPLY WITH LOW LEAKAGE CURRENT

BACKGROUND

1. Field of the Invention

The present invention relates generally to uninterruptible power supplies. More specifically, the preferred embodiments of the present invention relate to an uninterruptible power supply with controllable leakage current.

2. Background Discussion

Uninterruptible power supplies (UPSs) are commonly used to provide power to critical equipment that must not experience even short duration brownouts or blackouts. For example, computer servers, computer networks, telecommunications electronics and medical devices are often powered by an uninterruptible power supply.

A UPS device typically has an AC-DC-AC converter and backup battery that is activated in case the alternating current (AC) line power is temporarily disconnected or falls below a voltage threshold.

FIG. 1 shows a conventional UPS circuit according to the background art. The conventional UPS circuit includes an input rectifier (having switches Q1, Q2) and an output inverter (having switches Q3, Q4) connected in series. The input rectifier converts AC input power to DC power, and the output inverter converts the DC power to AC output power. Typically, the switches Q1, Q2, Q3, Q4 will be MOSFET devices or insulated gate bipolar transistors (IGBTs), though switches Q1 Q2 can also be diodes. The switches Q1, Q2, Q3, Q4 are controlled by a gate drive circuit (not shown). Storage capacitors C1, C2 store DC power. Typically, an isolation transformer T is provided. The input rectifier switches Q1, Q2 receive AC line power and provide direct current (DC) power to the inverter switches Q3, Q4. The inverter switches Q3, Q4 are typically operated according to a pulse-width modulation (PWM) scheme. The PWM waveform is filtered by output inductor Lo and output capacitor Co to create a smooth AC output waveform. With this arrangement, the voltage and frequency of the AC output can be accurately controlled and will be independent of the AC input.

Leakage current is often a problem with the conventional circuit of FIG. 1 and similar UPS circuits. Leakage current results when AC signals (egg from the PWM waveform produced by the inverter switches Q3, Q4) couple to ground, the device chassis, or nearby electronic components. A typical UPS providing a kilowatt of power may experience several hundred microamperes of leakage current. In some applications, leakage current can produce ground loop currents, noise, and disturbances in sensitive electronic circuits. Leakage current is particularly a problem in medical device electronics because medical devices are often very sensitive to noise and ground loop current. Leakage current can be dangerous in medical applications as it may cause a malfunction of critical life support or monitoring equipment.

Accordingly, there is a need in the art for a UPS circuit that has reduced leakage current. It would be particularly beneficial to provide a UPS circuit that has a leakage current less than an adjustable maximum level. Also, it would be beneficial to provide a UPS circuit that allows the maximum leakage current to be controlled by a user.

SUMMARY

The present invention improves upon the above and/or other background technologies and/or problems therein.

The preferred embodiments of the present invention provide an uninterruptible power supply (UPS) having a controllable leakage current. The preferred embodiments of the present UPS includes a rectifier circuit for converting input AC power into DC power, and an inverter circuit for converting the DC power to output AC power. The inverter circuit has at least one output switch. A gate drive circuit controls the output switch in the inverter circuit. In the present invention, the gate drive circuit is responsive to leakage current, and the gate drive circuit controls the switching speed (i.e., dV/dt rate) of the output switch such that a dV/dt rate of the output switch is reduced in response to increasing leakage current. Reducing the dV/dt rate reduces the amount of leakage current, when other parameters (e.g., output power) are unchanged. Reducing the dV/dt rate as output power increases can maintain the leakage current at a constant level.

In one embodiment, the gate drive circuit controls the dV/dt rate of the output switch such that leakage current is limited to less than a maximum value as output power is varied. The maximum leakage current can be set according to a maximum leakage current tolerable to a load.

The gate drive circuit can control the dV/dt rate by varying a gate resistance (connected to the output switch), or by varying a gate voltage (applied to the output switch).

The output inverter may have 2, 3, 4 or more output switches. Any number of the output switches can be controlled (i.e., with varying dV/dt rate) according to the present invention.

In an alternative embodiment, input switches (i.e., switches Q1 Q2) have controlled dV/dt rate, The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

DESCRIPTION OF THE FIGURES

The preferred embodiments of the present invention are shown by a way of example, and not limitation, in the accompanying figures, in which.

DETAILED DESCRIPTION

While the present invention may be embodied in many different forms, there is described here detailed illustrative embodiments with the understanding that the present disclosure is to be considered as an example of the principles of the invention and is not intended to limit the invention to the illustrated embodiments.

The preferred embodiments of the present invention provide an uninterruptible power supply (UPS) having a controllable leakage current. The leakage current of the present UPS can be controlled to be always less than a preselected but adjustable maximum value, for example. In the present UPS circuit, the leakage current is monitored (e.g. with a zero phase current transducer, or ZCT). The measured leakage current is used to control the operation of the inverter switches. Specifically, the inverter switches are controlled such that the switching speed (i.e., the dV/dt rate) of the output inverter switches is reduced when leakage current exceeds a threshold, or reduced as leakage current increases. The present inventors have discovered that reducing the dV/dt rate of the inverter switches will tend to reduce the magnitude of the high frequency current components that couple most strongly to nearby wires, chassis and other conductive components. Hence, reducing the dV/dt rate of the inverter switches tends to reduce undesirable leakage current caused by the coupling. Preferably, the dV/dt rate of the inverter switches is reduced as output power decreases so that the leakage current is held constant (or so that leakage current increases slowly) as output power varies. Accordingly, appropriate control of the dV/dt rate allows the leakage current to be held below a predetermined maximum value as operating conditions (e.g., output power) change. The dV/dt rate can be controlled by adjusting the gate resistance or gate voltage.

Definitions:

In some of the preferred embodiments of the invention, the following definitions can be employed.

Leakage current: Current flowing into the UPS circuit that does not provide useful, conditioned power to the load. Leakage current is coupled to electrical ground or a device chassis or other components that do not receive electrical power from the UPS. Leakage current is caused by inductive and capacitive coupling to components exterior to the UPS circuit. Leakage current is proportional to the difference in currents flowing into the rectifier switches Q1 Q2.

DV/dt rate: The time rate of change in voltage across the terminals (e.g., source and drain terminals) of the output inverter switches. Also known as the switching speed.

Figure 2A:
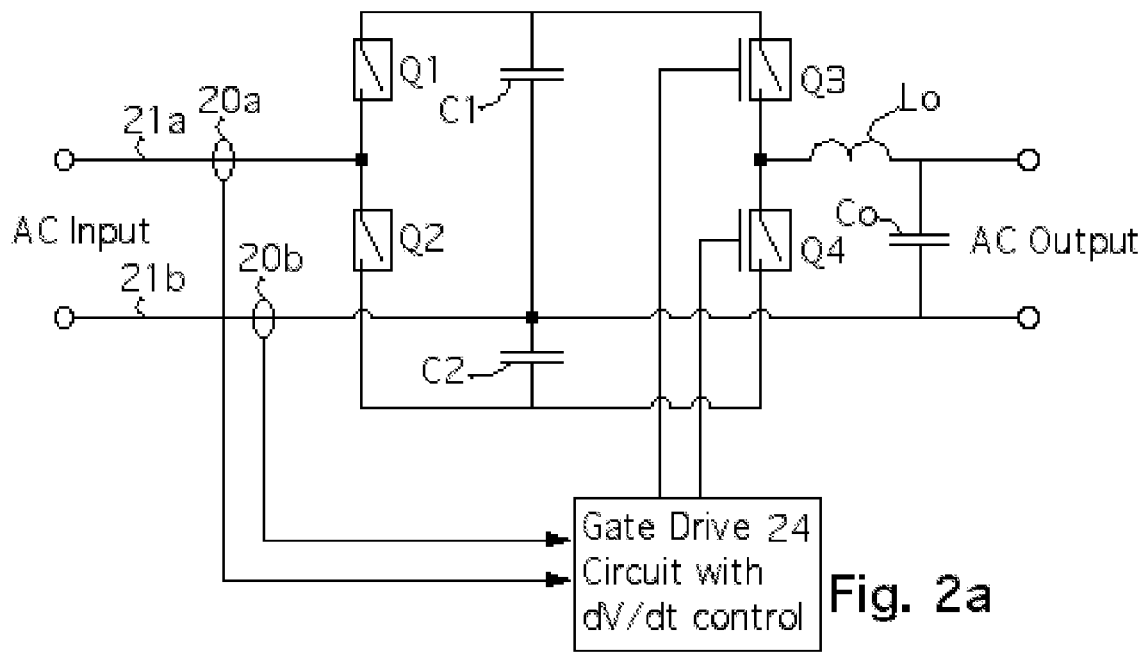
FIG. 2a shows a voltage regulator according to a first embodiment of the present invention.
Figure 2B:
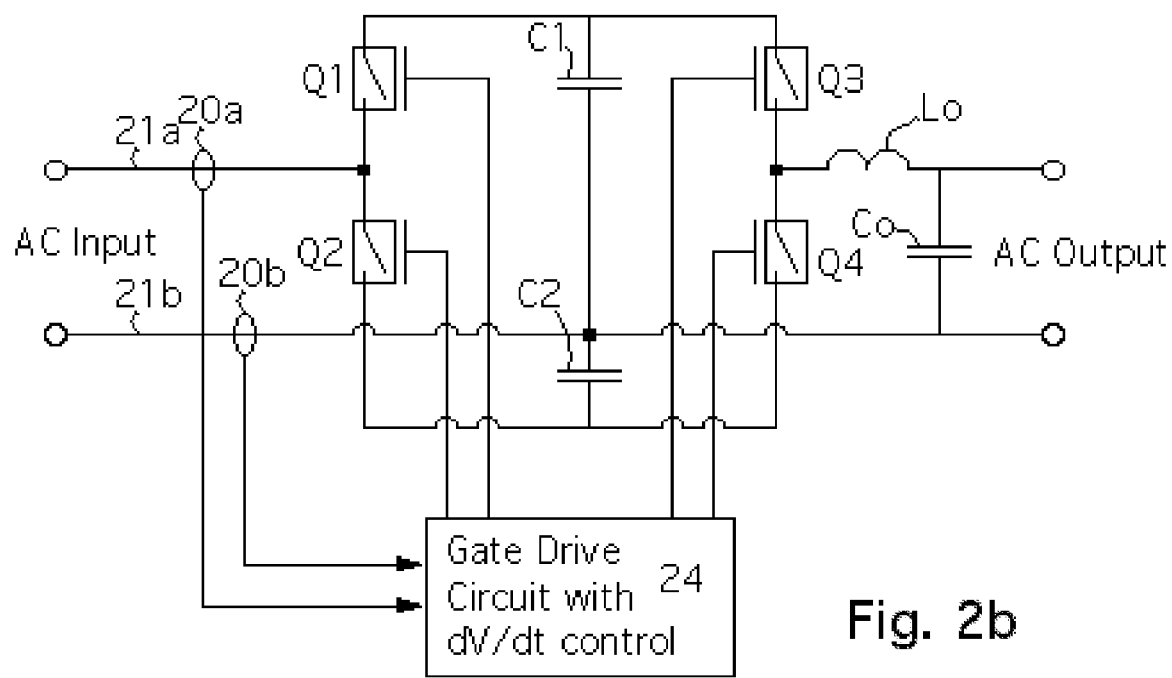
FIG. 2b shows a voltage regulator in which input switches are controlled to have a desired dV/dt switching speed.

FIG. 2 shows a UPS according to preferred embodiments of the present invention. The preferred embodiments of the present UPS includes one or more current sensors 20a 20b for measuring the currents (or difference in currents) flowing in the conductors 21a 21b. Signals from the current sensors 20 are received by a gate drive circuit 24 with dV/dt control. The gate drive circuit 24 preferably includes a threshold detector for detecting when the leakage current (i.e., the difference in currents in the conductors 21a 21b) exceeds a predetermined threshold. The gate drive circuit 24 necessarily has the capability of controlling the switching speed (i.e., the dV/dt rate) of the inverter switches Q3 Q4. The gate drive circuit 24 controls the operation of the inverter switches Q3 Q4 according to the leakage current detected by the sensor 20. Specifically, the dV/dt rate of the inverter switches Q3 Q4 is decreased as the leakage current increases. For example, the dV/dt rate can be reduced when the leakage current exceeds a threshold value.

In a preferred embodiment of the present invention, the sensors 20 comprise a single sensor that senses zer phase current (i.e. a difference in currents flowing in the conductors 21a 21b). For example, the sensors 20 can comprise a zero phase current transducer (also known as a "zero phase current transformer", or ZCT), which is essentially a toroidal Rogowski coil circumscribing both conductors 21a 21b. The sensor can have an air core or a ferromagnetic core. Such a sensor will provide an output current proportional to a difference in the currents flowing in the two input conductors 21a 21b. The current difference is caused by leakage current, and the current difference is proportional to leakage current. When there is zero leakage current, the currents flowing in the conductors 21a 21b will be precisely equal. In this case, a ZCT will produce zero phase current.

Alternatively, the sensors 20 can comprise any other kind of current sensor, such as a Hall effect sensor, transformer, pickup winding, magnetoelectric effect sensor or the like. If two separate sensors are used, the difference in currents can be determined by an operational amplifier circuit or the like.

Figure 1:
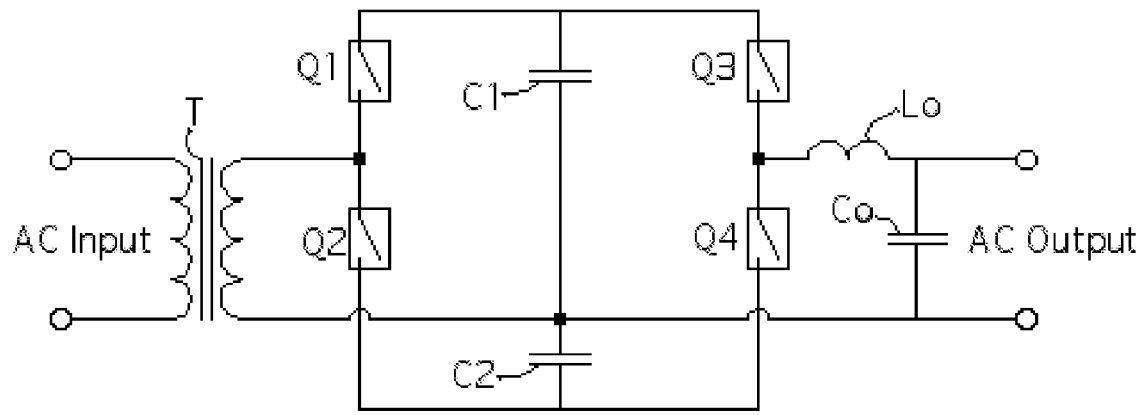
FIG. 1 (Prior Art) shows an uninterruptible power supply having a rectifier and inverter connected in series. The circuit of FIG. 1 suffers from excessive and uncontrollable leakage current.

The present UPS may include an isolation transformer T (not shown), as illustrated in FIG. 1. For brevity, an isolation transformer is not shown in FIG. 2.

Figure 3:
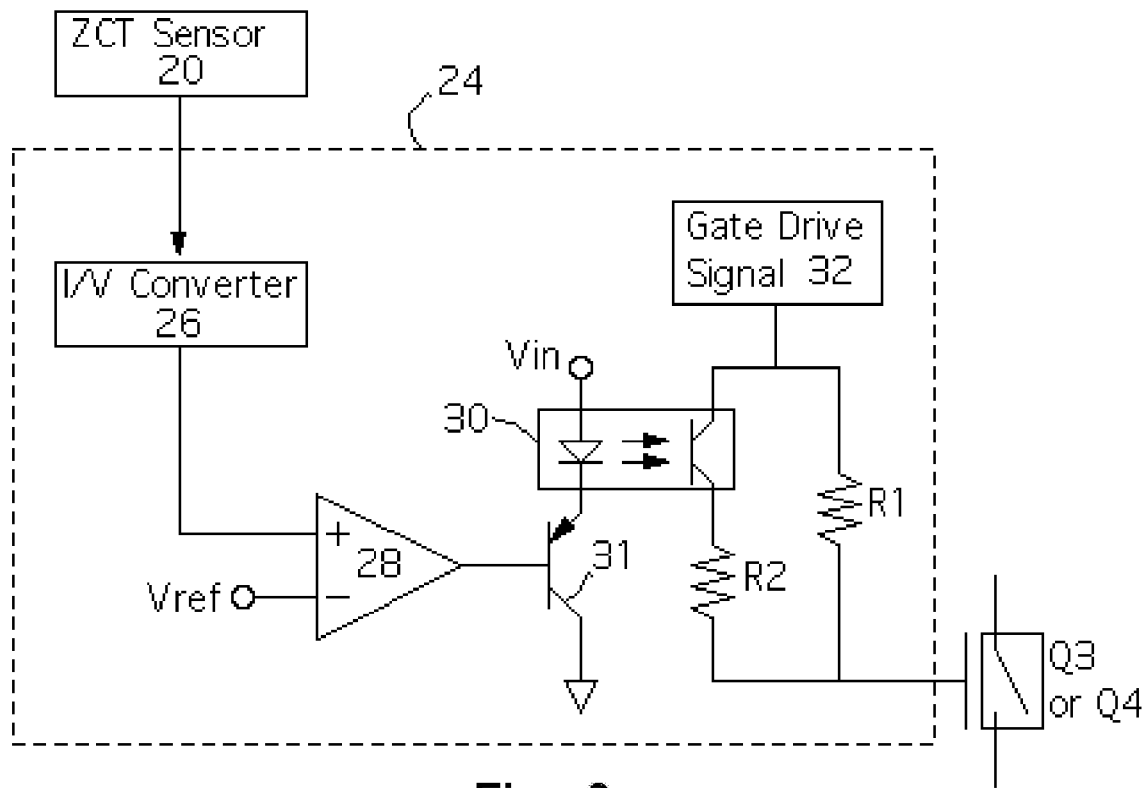
FIG. 3 shows a preferred gate drive circuit according to the present invention for controlling dV/dt by adjusting gate resistance.

FIG. 3 shows a detailed schematic of a preferred gate drive circuit 24. The circuit of FIG. 3 is for controlling only a single inverter switch (switch Q3 or Q4, but not both). The gate drive circuit 24 includes a current-to-voltage (I/V) converter 26. The I/V converter can comprise a transistor network, resistor or any other known circuit for converting the current produced by the sensor 20 into a voltage. Voltage from the I/V converter is provided to the noninverting input (+) of comparator 28. The comparator 28 may be slightly hysteretic to avoid multiple transitions and provide insensitivity to noise. Also, the comparator 28 may be replaced with an operational amplifier having a reduced and controllable amount of gain. A reference voltage Vref is provided to the inverting input (−). The reference voltage Vref is adjustable. Adjustment of the reference voltage Vref will vary the leakage current level at which the gate drive circuit begins adjustment of the dV/dt rate. The reference voltage Vref can be permanently fixed when the circuit is manufactured, or can be manually adjusted by a user, or can be adjusted by software (e.g. in response to the leakage current sensitivity of the load, or in response to the output power of the UPS).

The comparator 28 controls the operation of an optoisolator 30 via transistor 31. The optoisolator operates essentially as a variable resistor. The optoisolator controls the gate voltage applied to the inverter switch (Q3 or Q4) from a gate drive signal source 32. Resistors R1 R2 determine the range of adjustment of the gate resistance. Specifically, the gate resistance can vary between R1 (with optoisolator OFF) and R1R2/(R1+R2) (with optoisolator ON). The gate resistance determines the dV/dt rate (i.e., the switching speed) of the switches Q3 Q4. Specifically, a high gate resistance will tend to reduce dV/dt, and a low gate resistance will tend to increase dV/dt.

Figure 4A:
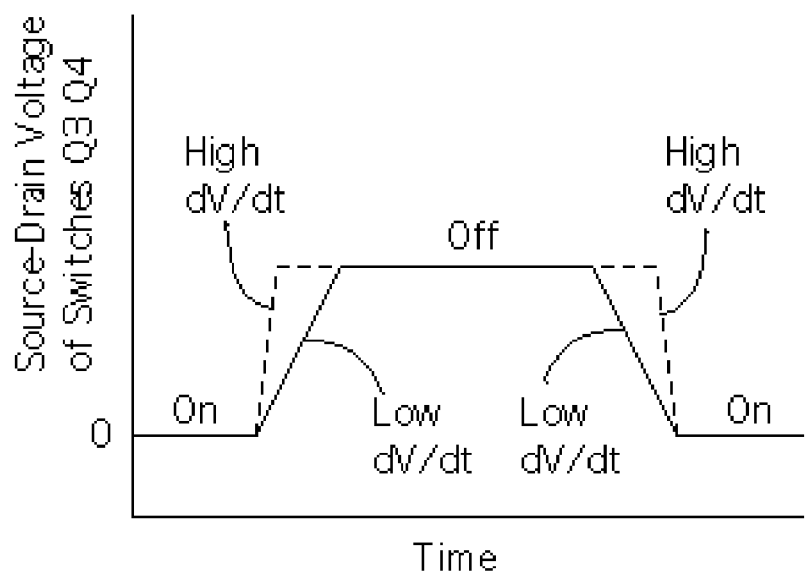
FIG. 4A shows a plot of source-drain voltage across switches Q3 Q4, illustrating high and low dV/dt rates.

FIG. 4A shows the source-drain voltage across an inverter switch Q3 Q4 for a single pulse, illustrating high and low dV/dt rates. A high dV/dt rate is the result of low gate resistance. Conversely, a low dV/dt rate is the result of high gate resistance. In a typical implementation of the present invention, a high dV/dt rate may be about 1500 volts/microsecond, and a low dV/dt rate may be about 700-1000 volts/microsecond. In the preferred embodiments of the present invention, the dV/dt rate may be changed by a factor of 2, 10, or 100 as leakage current changes. The adjustable range of dV/dt rate will depend greatly on the specific application of the UPS and its operating voltage and power range, type of output switches and other factors.

Figure 4B:
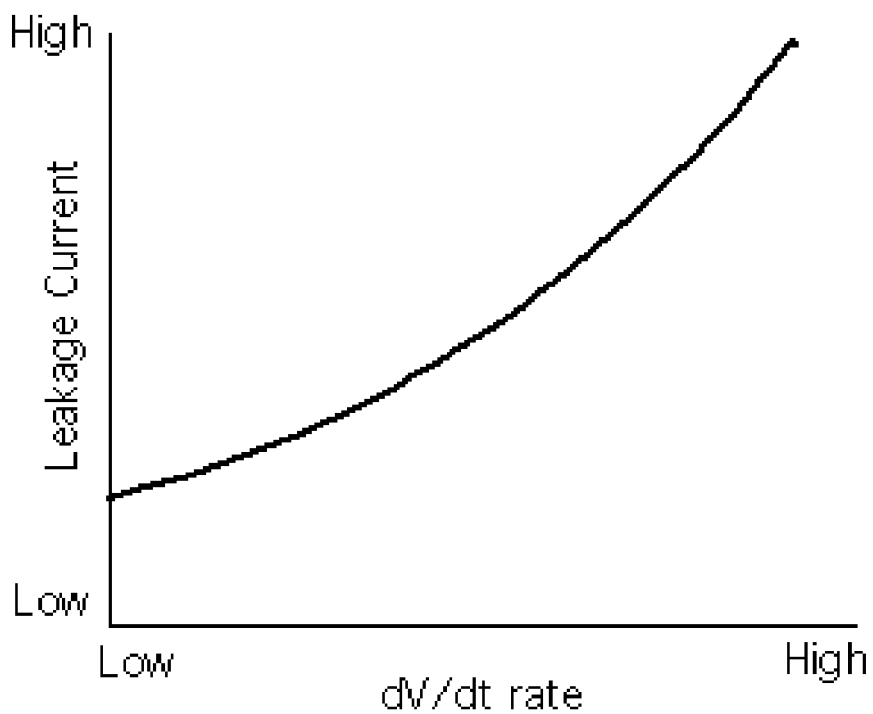
FIG. 4B shows a plot of leakage current versus dV/dt rate for a typical UPS device according to the present invention. The leakage current generally increases with increasing dV/dt rate, assuming a constant output power.

FIG. 4B shows a plot of leakage current versus dV/dt rate according to an illustrative embodiment of the present invention and as discovered by the present inventors. The plot of FIG. 4B assumes that all other operating parameters (e.g. output power, output voltage, AC output frequency) are unchanged as dV/dt rate is varied. The leakage current increases monotonically with increasing dV/dt rate. Without being limited to a particular theory of operation, it is believed by the present inventors that the increase in leakage current with increasing dV/dt rate is a result of high frequency AC components generated by the high dV/dt rate. High frequency components are more efficiently coupled to external conductors and ground and therefore result in higher leakage current. The relationship between leakage current and dV/dt rate may be linear or nonlinear, and will typically depend on the circuit layout and operating characteristics of a particular UPS circuit.

In operation of the circuit of FIG. 3, the current output from the sensor 20 is proportional to the leakage current and the voltage output from the I/V converter 26 is therefore also proportional to the leakage current. When the leakage current exceeds a threshold value (corresponding to a voltage from the converter 26 that exceeds the reference voltage Vref), the comparator is ON, the transistor 31 is OFF, the optoisolator is OFF, and the gate resistance is varied between R1R2/(R1+R2) and R1. The dV/dt rate will decrease as leakage current increases. Consequently, the leakage current of the UPS will be reduced compared to the background art (i.e., compared to a UPS that does not have dV/dt rate control).

Conversely, when the leakage current does not exceed a threshold value (corresponding to a voltage from the converter 26 that exceeds the reference voltage Vref), the comparator is OFF, the transistor 31 is ON, the optoisolator is ON, and the gate resistance is equal to R1R2/(R1+R2), and is not varied. The gate resistance (R1R2/(R1+R2)) will be relatively low, and the inverter switch will have a high dV/dt rate. Consequently, the leakage current of the UPS will be unaffected.

Figure 4C:
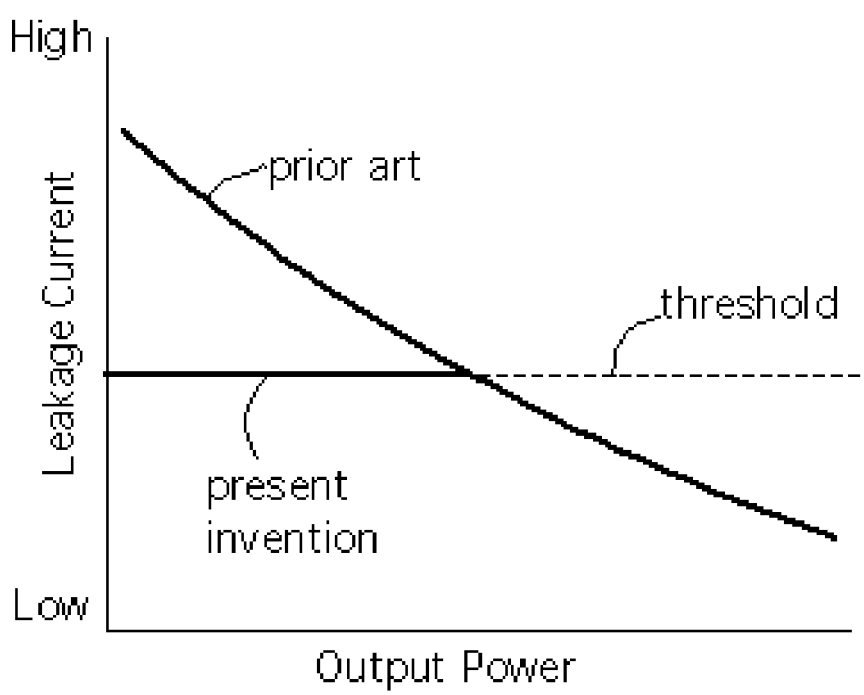
FIG. 4C shows a plot of leakage current versus output power for a conventional, prior art UPS (that does not have an adjustable dV/dt rate), and a UPS according to the present invention.

FIG. 4C shows a plot of leakage current versus output power for a UPS according to the prior art and according to the preferred embodiments of the present invention. It is well known that leakage current tends to increase monotonically with decreasing output power. In the preferred embodiments of the present invention, the leakage current is reduced compared to the prior art, for leakage current values above the threshold value. In the preferred embodiments of the present invention, the leakage current can be limited such that it does not exceed the threshold value, as illustrated in FIG. 4C.

Figure 4D:
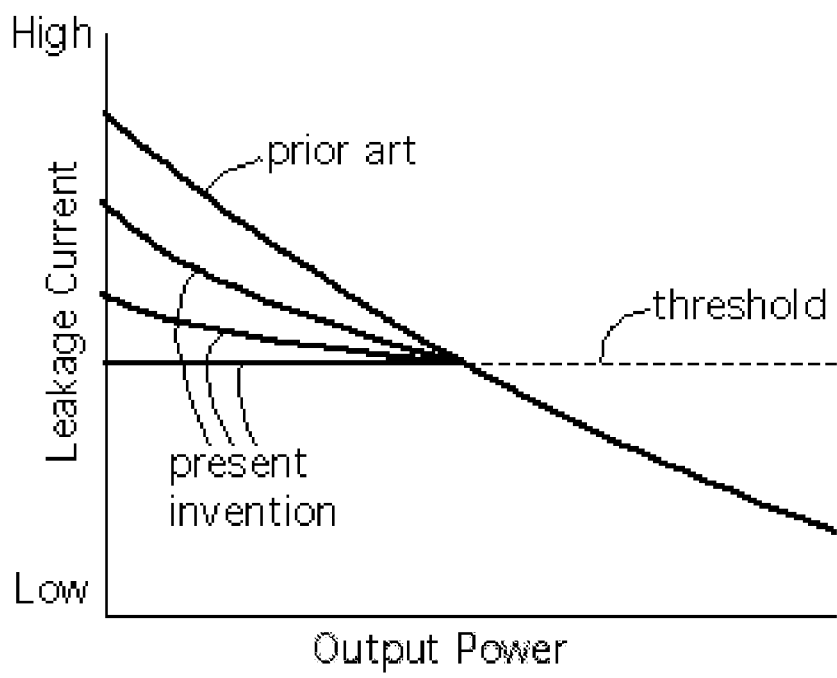
FIG. 4D shows a plot of leakage current versus output power for various embodiments of the present invention in which the leakage current is reduced by different amounts.

It is noted that the leakage current in the present invention can be maintained exactly equal the threshold value, as illustrated in FIG. 4C. Alternatively, the dV/dt rate can be controlled as output power varies such that the leakage current has any arbitrary, desired variation with respect to output power. For example, FIG. 4D shows several plots A B C in which the leakage current is varied by different amounts. Plot A corresponds to a relatively large reduction in leakage current (requiring a large reduction in dV/dt rate), and plot C corresponds to a relatively small reduction in leakage current (requiring a small reduction in dV/dt rate).

It is noted that a reduction in dV/dt rate tends to increase the switching losses in the output switches. Consequently, a large reduction in leakage current may result in increased power dissipation. For example, operating the UPS according to plot A may require more power dissipation and heat generation compared to operating the UPS according to plot C. Hence, the preferred embodiments of the present invention present a design tradeoff between leakage current and power dissipation. Reduced leakage current may come at a cost of increased power dissipation.

However in some embodiments, the power saved from reduced leakage current may exceed the increased power dissipation from switching losses. In this case, the preferred embodiments of the present invention will provide a net increase in energy efficiency. Hence, the present invention can in some cases provide a UPS circuit with improved energy efficiency.

Figure 5:
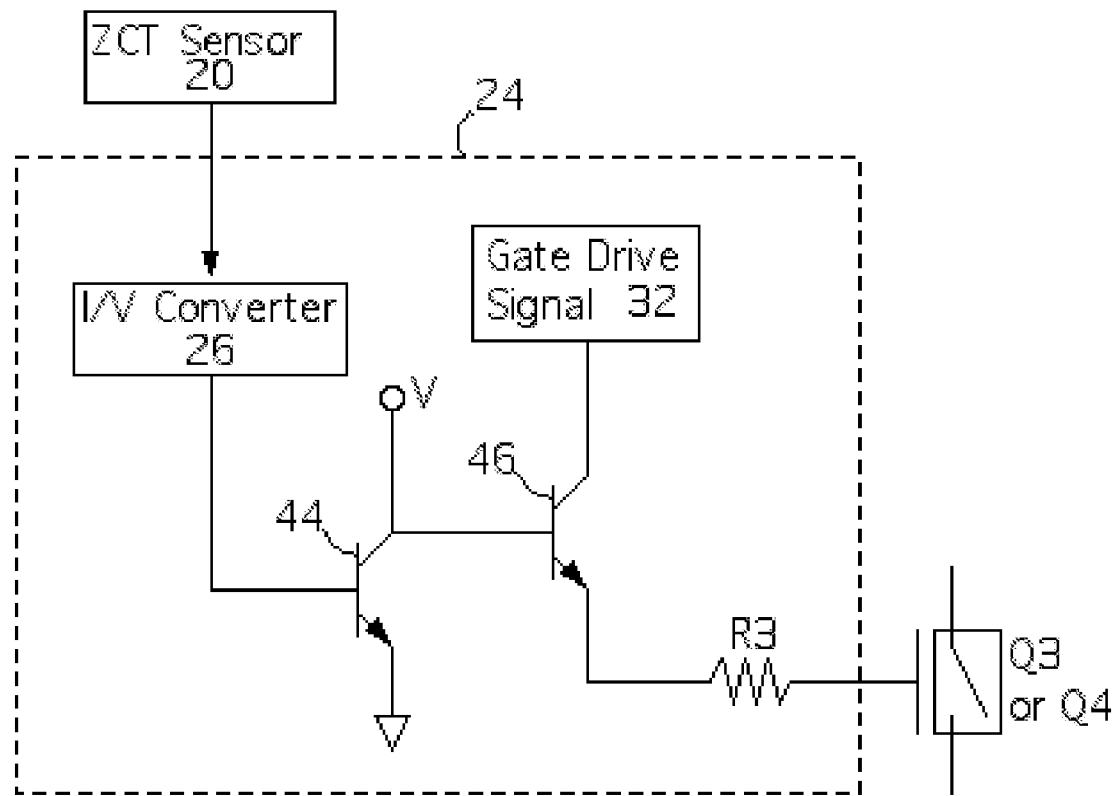
FIG. 5 shows a preferred gate drive circuit according to some embodiments of the present invention for controlling dV/dt by adjusting gate voltage.

The preferred embodiments of the present invention and appended claims include, among other things, a second embodiment in which the dV/dt rate is controlled by adjusting a gate voltage (instead of adjusting the gate resistance, as in the above-described embodiment). FIG. 5 shows a gate drive circuit 24 for adjusting the gate voltage applied to the gates of inverter switches Q3 Q4. In FIG. 5, the gate drive circuit comprises the I/V converter 26, two transistors 44 46, and a fixed gate resistor R3. The transistors 44 46 control the gate voltage applied to the inverter switches Q3 44. Specifically, when the leakage current increases, the voltage across transistor 44 decreases, and the voltage across transistor 46 increases, resulting in a lower gate voltage applied to Q3 or Q4.

Figure 6:
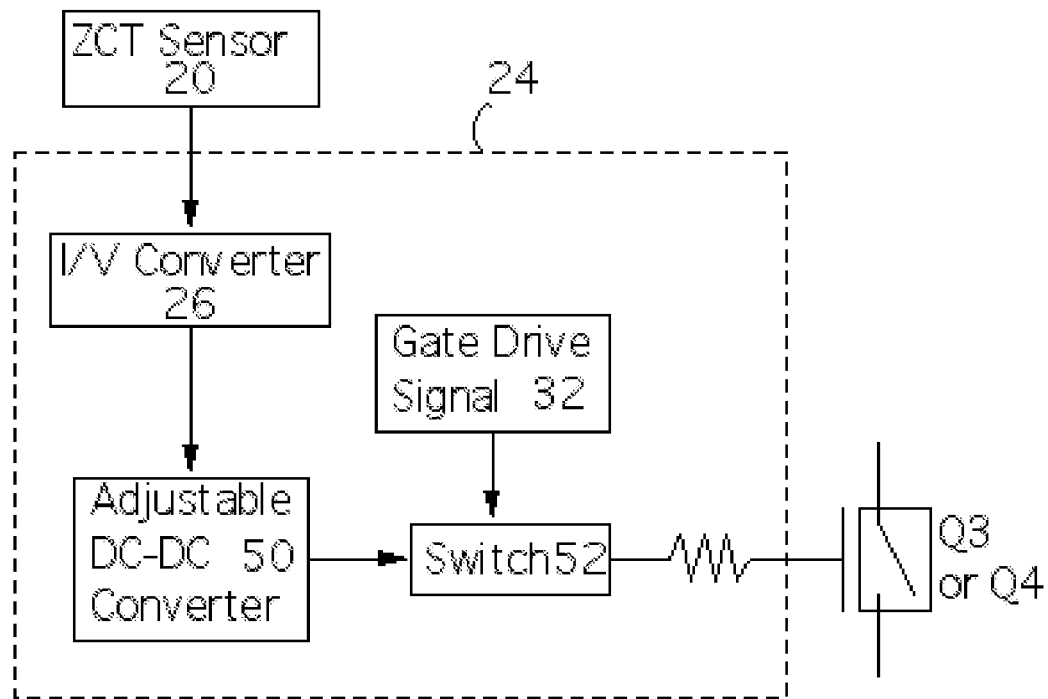
FIG. 6 shows a preferred gate drive circuit according to some embodiments of the present invention for controlling dV/dt by adjusting gate voltage. The gate voltage is provided by an adjustable DC-DC voltage converter.

FIG. 6 shows an alternate embodiment in which an adjustable DC-DC voltage converter 50 is provided. The DC-DC converter 50 is responsive to an output of the I/V converter 26. The voltage from the DC-DC converter is supplied to a switch 52 (e.g., a MOSFET switch, or transistor). The switch is controlled by the gate drive signal 32. Hence, the gate voltage is essentially determined by the output voltage of the DC-DC converter 50.

In operation, as the leakage current increases, the voltage from the I/V converter 26 increases, and the voltage from the DC-DC converter 50 decreases, resulting in a decrease in gate voltage, and resulting in a decrease in dV/dt rate. In the preferred embodiments present invention, any known type of adjustable DC-DC converter 50 can be used.

Figure 7:
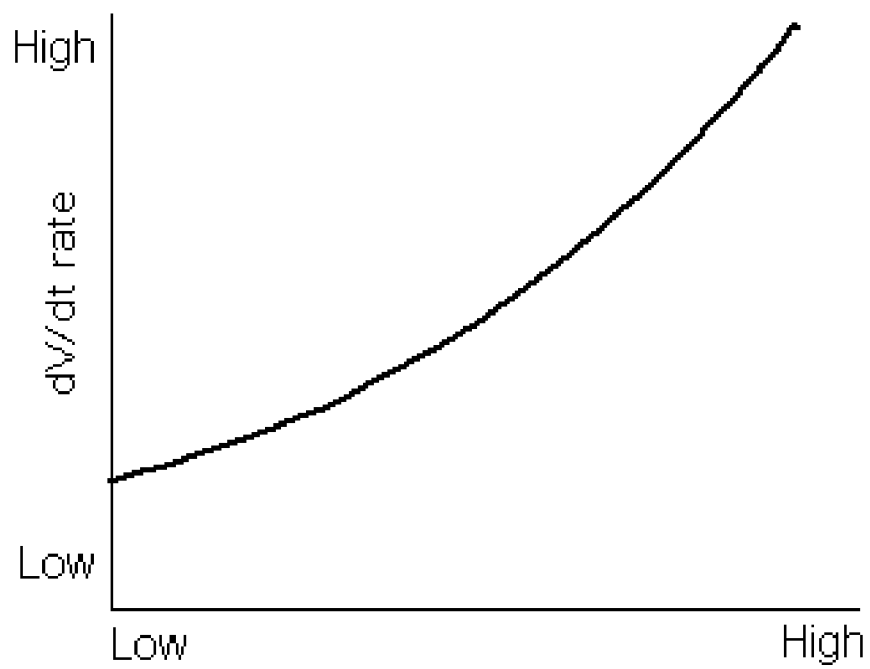
FIG. 7 shows a plot of dV/dt rate versus DC-DC converter voltage (i.e., gate voltage) for the circuit of FIG. 6.

FIG. 7 shows a plot illustrating the relationship between the DC-DC converter output voltage and dV/dt rate. The dV/dt rate increases with increasing voltage from the DC-DC converter. Accordingly, the leakage current tends to increase with increasing DC-DC converter voltage, assuming all other factors (e.g. output power) remain constant.

Figure 8:
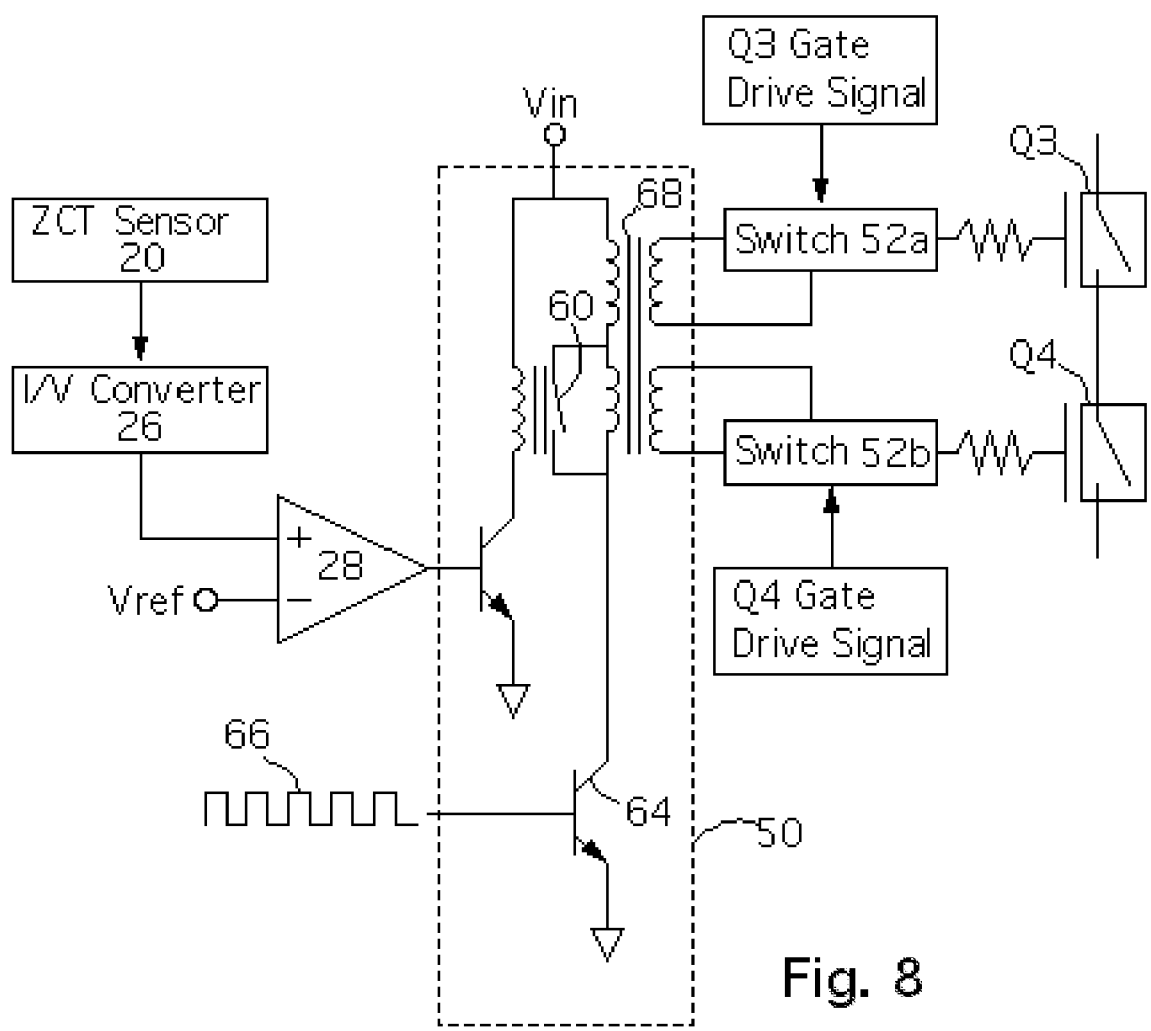
FIG. 8 shows a circuit with a specific DC-DC converter that can be used in the embodiment of FIG. 7.

FIG. 8 shows a specific DC-DC converter circuit 50 that can be used in the present invention for adjusting the dV/dt rate. The DC-DC converter 50 includes a relay 60 that is controlled by the comparator 28. Specifically, the relay is open when the comparator output is high. Transistor 64 is controlled by squarewave signal 66 to transfer primary voltage to secondary voltage in transformer 68. In operation, the relay switch 60 opens when the leakage current exceeds a threshold determined by Vref. Men the relay switch 60 is open, the turns ratio of the transformer 68 is changed such that the output voltage of the DC-DC converter 50 is reduced. A significant advantage of the DC-DC converter of FIG. 8 is that the gate voltage for several output switches Q3 Q4 can be simultaneously controlled by a single comparator 28.

It is noted that both the gate resistance and gate voltage can be varied simultaneously some embodiments of the present invention. Many different circuits that adjust the gate voltage or gate resistance can be used in the present invention. The present invention and appended claims are not limited to the specific gate drive circuits described.

It will be clear to one skilled in the art that the above embodiment may be altered in many ways without departing from the scope of the invention. Accordingly, the scope of the invention should be determined by the following claims and their legal equivalents.

Broad Scope of the Invention:

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "represent invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A uninterruptible power supply (UPS) having a controllable leakage current, comprising:
   a) a rectifier circuit for converting input AC power into DC power;
   b) an inverter circuit for converting DC power from the rectifier into AC output power, wherein the inverter circuit comprises at least one output switch; and
   c) a gate drive circuit for controlling the inverter output switch, wherein the gate drive circuit is responsive to leakage current and controls the inverter output switch such that a dV/dt rate of the output switch is reduced in response to increasing leakage current;
      wherein the gate drive circuit controls the dV/dt rate of the output switch by varying a gate voltage.

2. The UPS of claim 1, wherein the gate drive circuit controls the dV/dt rate of the output switch such that leakage current is limited to a maximum value as output power is varied.

3. The UPS of claim 1, wherein the inverter circuit comprises two output switches.

4. The UPS of claim 1, wherein the gate drive circuit controls the dV/dt rate of the output switch such that leakage current is less than a maximum value tolerated by a load.

5. A uninterruptible power supply (UPS) having a controllable leakage current, comprising:
   a) a rectifier circuit for converting input AC power into DC power;
   b) an inverter circuit for converting DC power from the rectifier into AC output power, wherein the inverter circuit comprises at least one output switch; and
   c) a gate drive circuit for controlling the inverter output switch, wherein the gate drive circuit is responsive to leakage current and controls the inverter output switch such that a dV/dt rate of the output switch is reduced in response to increasing leakage current;
      further comprising a zero phase current transducer for sensing an amount of leakage current.

6. A uninterruptible power supply (UPS) having a controllable leakage current, comprising:
   a) a rectifier circuit for converting input AC power into DC power;
   b) an inverter circuit for converting DC power from the rectifier into AC output power, wherein the inverter circuit comprises at least one output switch; and
   c) a gate drive circuit for controlling the inverter output switch, wherein the gate drive circuit is responsive to leakage current and controls the inverter output switch such that a dV/dt rate of the output switch is reduced in response to increasing leakage current;
      wherein the gate drive circuit comprises:
      a) a I/V converter for converting a current from a leakage current sensor into a voltage, and
      b) a comparator for comparing the voltage from the I/V converter with a reference voltage.

7. The UPS of claim 1, wherein the rectifier circuit includes at least one input switch, and wherein the gate drive circuit controls a dV/dt rate of the input switch such that leakage current is limited to a maximum value as output power is varied.

8. An uninterruptible power supply (UPS) having a controllable leakage current, comprising:
   a) a rectifier circuit for converting input AC power into DC power;
   b) an inverter circuit for converting DC power from the rectifier into AC output power, wherein the inverter circuit comprises at least one output switch;
   c) a gate drive circuit for controlling the inverter output switch, wherein the gate drive circuit is responsive to leakage current and controls the inverter output switch such that a dV/dt rate of the output switch is reduced in response to increasing leakage current; and
      wherein the gate drive circuit controls the dV/dt rate of the output switch by varying a gate voltage;

further comprising a zero phase current transducer for sensing an amount of leakage current.

9. The UPS of claim 8, wherein the gate drive circuit controls the dV/dt rate of the output switch such that leakage current is less than a maximum value tolerated by a load.

10. The UPS of claim 8, wherein the gate drive circuit controls the dV/dt rate of the output switch such that leakage current is limited to a maximum value as output power is varied.

11. An uninterruptible power supply (UPS) having a controllable leakage current, comprising:
   a) a rectifier circuit for converting input AC power into DC power;
   b) an inverter circuit for converting DC power from the rectifier into AC output power, wherein the inverter circuit comprises at least one output switch;
   c) a gate drive circuit for controlling the inverter output switch, wherein the gate drive circuit is responsive to leakage current and controls the inverter output switch such that a dV/dt rate of the output switch is reduced in response to increasing leakage current; and
   wherein the gate drive circuit controls the dV/dt rate of the output switch by varying a gate voltage;
   wherein the variable gate voltage is provided by a variable voltage DC-DC converter.

* * * * *